(12) United States Patent
Takano et al.

(10) Patent No.: US 7,283,303 B2
(45) Date of Patent: Oct. 16, 2007

(54) CONDUCTIVE ANTI-REFLECTION COATING

(75) Inventors: Kazuaki Takano, Santa Rosa, CA (US); Andrew John Church, Santa Rosa, CA (US); Thomas R. Jones, Santa Rosa, CA (US); Brad Scott Tarter, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 369 days.

(21) Appl. No.: 10/901,696

(22) Filed: Jul. 29, 2004

(65) Prior Publication Data

US 2006/0023131 A1    Feb. 2, 2006

(51) Int. Cl.
*G02B 1/10* (2006.01)
(52) U.S. Cl. .............. 359/582; 359/585; 359/587
(58) Field of Classification Search ........... 359/582, 359/585, 586, 588
See application file for complete search history.

(56) References Cited

U.S. PATENT DOCUMENTS

| 4,422,721 A | 12/1983 | Hahn et al. ............ 350/164 |
| 5,362,552 A | 11/1994 | Austin ................... 428/216 |
| 5,667,880 A | 9/1997 | Okaniwa ............... 428/212 |
| 6,532,112 B2 | 3/2003 | Chu ....................... 359/585 |
| 6,586,101 B2 | 7/2003 | Chu ....................... 428/432 |
| 6,855,369 B2 * | 2/2005 | Nakamura et al. ..... 427/164 |

* cited by examiner

*Primary Examiner*—Fayez G. Assaf
(74) *Attorney, Agent, or Firm*—Allen, Dyer, Doppelt, Milbrath & Gilchrist, P.A.

(57) ABSTRACT

A conductive anti-reflection coating has a surface quarter-wave layer that is broken up into smaller portions by inserting one or more thin layers of conductive material in the dielectric material. The resulting stack of alternating layers of a dielectric material and an electrically conductive material provides a solid electrical contact to the buried conductive layer and exhibits a low surface contact resistance.

30 Claims, 3 Drawing Sheets

CONDUCTIVE ANTI-REFLECTION COATING

CROSS-REFERENCE TO RELATED APPLICATIONS

Not Applicable.

MICROFICHE APPENDIX

Not Applicable.

TECHNICAL FIELD

The present application relates generally to conductive anti-reflection coatings, and in particular, to conductive anti-reflection coatings with low surface contact resistance.

BACKGROUND OF THE INVENTION

Anti-reflection coatings are used extensively in optical and/or opto-electrical applications where it is often necessary to decrease reflections at an interface, such as at the boundary between air and glass.

The simplest anti-reflection coating consists of a single layer of a transparent dielectric material deposited directly on a substrate. The layer of transparent dielectric material is selected such that it has an index of refraction, n, that is less than the index of refraction of the substrate, and such that it has a thickness, d, that allows the optical thickness (n times d) to be about one quarter of the central wavelength of the spectral region for which the reflectance is to be reduced.

More complex anti-reflection coatings are made by depositing two or more layers of transparent dielectric materials on a substrate. For example, according to one type of anti-reflection coating, a first layer having an index of refraction higher than that of the substrate is deposited on the substrate such that its optical thickness is about one quarter of the central wavelength, while a second layer having an index of refraction lower than that of the substrate is deposited on the first layer such that its optical thickness is also about a quarter of the central wavelength. This type of anti-reflection coating is often referred to as a V-coat design because it generally achieves a zero reflectance at the central wavelength, with sharply increasing reflectance at either side of the central wavelength.

Multi-layer anti-reflection coatings that are more suitable for broadband applications generally have at least three dielectric layers of alternating high and low refractive index materials stacked together. For example, one particularly well-known broadband anti-reflection coating includes a first layer formed from a material having a high index of refraction and having an optical thickness of about one-eighth of the central wavelength deposited on the substrate, a second layer formed from a material having a low index of refraction and having an optical thickness of about one-eighth the central wavelength deposited on the first layer, a third layer formed from a material having a high index of refraction and having an optical thickness of one half the central wavelength deposited on the second layer, and a fourth layer formed from a material having a low index of refraction and having an optical thickness of one quarter of the central wavelength deposited on the third layer. The optical thicknesses of the first and second layers are selected to provide a combined optical thickness that is about one quarter of the central wavelength of the spectral region for which the reflectance is to be reduced such that first and second layers form what is commonly referred to as a simulated quarterwave layer.

As illustrated above, the surface layer of most anti-reflection coatings is selected to have a low index of refraction, which is preferably lower than that of the substrate, and a quarterwave optical thickness so as to minimize reflectance from the surface of the coating. While this is feasible in most instances, design challenges often arise when the anti-reflective coating is designed to be electrically conductive.

Conductive anti-reflection coatings have found widespread use in numerous applications where electrical conductivity and high optical transparency are needed. For example, conductive anti-reflection coatings are commonly used for electro-magnetic interference (EMI) shielding in cathode ray tubes (CRTs), as electrodes in liquid crystal displays (LCDs), and in thin film resistive heaters. In these applications, the electrical conductivity is typically provided by a layer of transparent electrically conductive material, such as indium tin oxide (ITO).

The index of refraction of most transparent electrically conductive materials, however, is relatively large. It is this high index of refraction that complicates the design of conductive anti-reflection layers. For example, as discussed above, it is generally preferred that the surface layer of an anti-reflection coating be a quarterwave dielectric layer having a low index of refraction so as to minimize reflectance from the surface of the coating. In contrast, it is also preferred that the conductive layer, which generally has a high index of refraction, be fabricated as the surface layer to reduce the high contact resistance associated with a surface quarterwave dielectric layer.

In practice, most conductive anti-reflection coatings are arranged such that the conductive layer is buried below a quarterwave dielectric layer. For example, in the above-mentioned four layer design for broadband applications, the conductive layer typically corresponds to the halfwave layer. This arrangement improves the anti-reflection properties of the coating, protects the conductive layer, and provides more flexibility in varying the thickness of the conductive layer. To reduce the high contact resistance associated with the surface quarterwave dielectric layer, the electrical connections are typically made either by penetrating the surface dielectric layer (e.g., using an ultra-sonic soldering or welding procedure) or with direct contact to the conductive layer in regions where the dielectric layer is absent (e.g., using a mask during production to keep the conductive surfaces free of dielectric material).

Unfortunately, these methods of reducing surface contact resistance significantly increase costs and lengthen production times. In particular, ultra-sonic soldering or welding procedures are known to cause a bottleneck in the production of conductive anti-reflection coatings. Similarly, using a mask to create dielectric-free regions on the conductive layer is associated with expensive precision tooling and additional time-consuming steps. For example, when the conductive and dielectric layers are deposited by vacuum evaporation, the latter process includes the additional time-consuming steps of venting the chamber after the conductive layer has been deposited, precisely applying the mask, and re-evacuating the chamber prior to depositing the surface dielectric layer.

It is an object of the instant invention to provide a conductive anti-reflection coating with low surface contact resistance.

It is another object of the instant invention to provide a conductive anti-reflection coating with low surface contact resistance that is fabricated without significantly increased costs and lengthened production times.

SUMMARY OF THE INVENTION

The instant invention relates to a conductive anti-reflection coating wherein the surface quarterwave layer is broken up into smaller portions by inserting one or more thin layers of conductive material in the dielectric material. The resulting stack of alternating layers of a dielectric material and an electrically conductive material provides a solid electrical contact to the buried conductive layer and exhibits a low surface contact resistance.

In accordance with one aspect of the instant invention there is provided a conductive anti-reflection coating comprising: at least one layer disposed on a surface of a substrate; an electrically conductive layer disposed on the at least one layer; and, a stack of layers disposed on the electrically conductive layer, the stack of layers including at least four alternating layers of a dielectric material and an electrically conductive material, the stack of layers having a total optical thickness of about one quarter of the central wavelength of a spectral region for which reflectance is to be reduced.

In accordance with one aspect of the instant invention there is provided a conductive anti-reflection coating comprising: a stack of layers for providing low surface contact resistance to a buried conductive layer, the stack of layers including a first layer formed from a first dielectric material, a second layer formed from a first electrically conductive material, a third layer formed from a second dielectric material, and a fourth layer formed from a second electrically conductive material, wherein the stack of layers has a total optical thickness substantially equal to one quarter of the central wavelength of a spectral region for which reflectance is to be reduced.

In accordance with one aspect of the instant invention there is provided a conductive anti-reflection coating comprising: a first layer deposited on one side of a substrate, the first layer formed from a material having an index of refraction that is greater than an index of refraction of the substrate; a second layer deposited on the first layer, the second layer formed from a dielectric material having an index of refraction that is less than the index of refraction of the substrate; a third layer deposited on the second layer, the third layer formed from an electrically conductive material having an index of refraction that is greater than the index of refraction of the substrate; a fourth layer deposited on the third layer, the fourth layer formed from the dielectric material and being less than about 30 nm thick; a fifth layer deposited on the fourth layer, the fifth layer formed from the electrically conductive material and being less than about 10 nm thick; a sixth layer deposited on the fifth layer, the sixth layer formed from the dielectric material and being less than about 30 nm thick; and a seventh layer deposited on the sixth layer, the seventh layer formed from the electrically conductive material and being less than about 10 nm thick.

In accordance with one aspect of the instant invention there is provided a conductive anti-reflection coating comprising: a stack of layers for providing low surface contact resistance to a buried conductive layer, the stack of layers including a first dielectric layer disposed on the buried conductive layer, a second conductive layer disposed on the first dielectric layer, and a third dielectric layer disposed on the second conductive layer, wherein the stack of layers forms a simulated quarterwave layer.

In accordance with another aspect of the instant invention there is provided a method of forming a conductive anti-reflection coating comprising: depositing at least one layer on a surface of a substrate; depositing an electrically conductive layer on the at least one layer; and, depositing a stack of layers on the electrically conductive layer, the stack of layers including at least four alternating layers of a dielectric material and an electrically conductive material, the stack of layers having a total optical thickness of about one quarter of the central wavelength of a spectral region for which reflectance is to be reduced.

BRIEF DESCRIPTION OF THE DRAWINGS

Further features and advantages of the present invention will become apparent from the following detailed description, taken in combination with the appended drawings, in which:

FIG. 4a is a cross-sectional view of a thin film resistive heater including a conductive anti-reflection coating in accordance with the instant invention; and, FIG. 4b is a top view of the resistive heater shown in FIG. 4a.

It will be noted that throughout the appended drawings, like features are identified by like reference numerals.

DETAILED DESCRIPTION OF THE PREFERRED EMBODIMENTS

Figure 1:
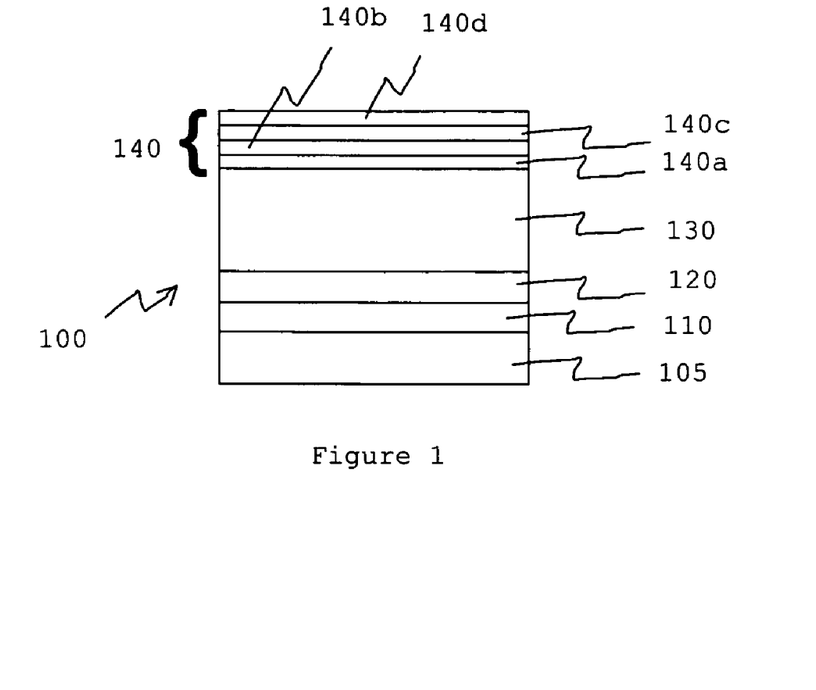
FIG. 1 is a schematic diagram of a conductive anti-reflection coating in accordance with one embodiment of the instant invention.

Referring to FIG. 1, there is shown a conductive anti-reflection coating in accordance with one embodiment of the instant invention. The anti-reflection coating 100, which is disposed on a substrate 105, includes a first layer made of a conductive material 110, a second layer made of a dielectric material 120, a third layer made of a conductive material 130, a fourth layer made of a dielectric material 140a, a fifth layer made of a conductive material 140b, a sixth layer made of a dielectric material 140c, and a seventh layer made of a conductive material 140d. The fourth 140a, fifth 140b, sixth 140c, and seventh 140d layers form a stack 140 of four alternating layers of a dielectric material and an electrically conductive material.

The substrate 105 is fabricated from a transparent material such as glass or polymer, which typically has an index of refraction of 1.47 to 1.7 in the visible region (e.g., at 550 nm). Substrate thickness is usually in the range of 0.7 to 4.0 mm. Of course other thicknesses and/or indices of refraction are also possible.

The conductive materials used in each of the first 110, third 130, fifth 140b, and seventh 140d layers are transparent electrically conductive materials having an index of refraction that is greater than that of the substrate. One example of suitable conductive material is indium tin oxide (ITO), which has an index of refraction of 2.0 at 550 nm. Other examples include tin antimony oxide and cadmium stannate.

The dielectric materials used in each of the second 120, fourth 140a, and sixth 140c layers are transparent non-conductive materials having an index of refraction that is lower than that of the substrate. Some examples of suitable dielectric materials include magnesium fluoride ($MgF_2$), which has an index of refraction of about 1.38 at 550 nm, and silicon dioxide ($SiO_2$), which has an index of refraction of about 1.46 at 550 nm.

Preferably, the same conductive material is used in each of the first 110, third 130, fifth 140b, and seventh 140d layers, and the same dielectric material is used in each of the second 120, fourth 140a, and sixth 140c layers, however, those skilled in the art will know to use different dielectric and/or conductive materials to tailor the optical properties. Using the same conductive material for each of the first 110, third 130, fifth 140b, and seventh 140d layers, and the same dielectric material for each of the second 120, fourth 140a, and sixth 140c layers, advantageously only requires two coating materials to fabricate the entire anti-reflection coating 100.

The physical thickness of each of the seven layers is selected to provide the desired resistance and optical properties of the conductive anti-reflection coating 100. The thickness of each of the first 110 and second 120 layers is selected such that together they form a first simulated quarterwave layer that raises the effective index of refraction of the substrate 105. The thickness of the third layer 130 is selected to provide the desired conductivity and/or an optical thickness of approximately one half of the central wavelength of the spectral region for which the reflectance is to be reduced. For example, the third layer 130 is optionally designed with a thickness that is less than or greater than a halfwave. The thickness of each of the fourth 140a, fifth 140b, sixth 140c, and seventh 140d layers is selected such that they collectively form a second simulated quarterwave layer that provides the anti-reflective function and a low surface contact resistance.

Advantageously, the thickness of each dielectric layer in the second simulated quarterwave layer is reduced relative to a quarterwave dielectric layer. Since the resistivity of dielectric layers becomes very low as the thickness of the layers is reduced, the dielectric layers 140a and 140c actually support electrical conduction through the stack 140 to the conductive layer 130. This reduces the surface contact resistance.

In the above described embodiment, the second simulated quarterwave layer is a four layer structure. It is also within the scope of the instant invention to provide fewer or more layers in the second simulated quarterwave layer.

Figure 2:
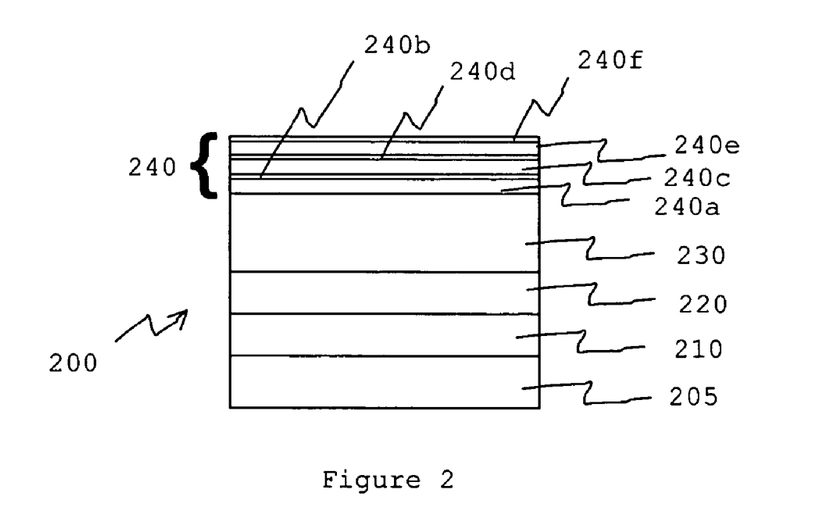
FIG. 2 is a schematic diagram of a conductive anti-reflection coating in accordance with another embodiment of the instant invention.

Referring to FIG. 2, there is shown a conductive anti-reflection coating in accordance with another embodiment of the instant invention. The anti-reflection coating 200, which is disposed on a substrate 205, includes a first layer made of a conductive material 210, a second layer made of a dielectric material 220, a third layer made of a conductive material 230, a fourth layer made of a dielectric material 240a, a fifth layer made of a conductive material 240b, a sixth layer made of a dielectric material 240c, a seventh layer made of a conductive material 240d, an eighth layer made of a dielectric material 240e, and a ninth layer made of a conductive material 240f. The fourth 240a, fifth 240b, sixth 240c, seventh 240d, eighth 240e, and ninth 240f layers form a stack 240 of six alternating layers of a dielectric material and an electrically conductive material.

The substrate 205 is fabricated from a transparent material such as glass or polymer, which typically has an index of refraction of 1.47 to 1.7 in the visible region (e.g., at 550 nm). Substrate thickness is usually in the range of 0.7 to 4.0 mm. Of course other thicknesses and/or indices of refraction are also possible.

The conductive materials used in each of the first 210, third 230, fifth 240b, seventh 240d, and ninth 240f layers are transparent electrically conductive materials having an index of refraction that is greater than that of the substrate. One example of a suitable conductive material is indium tin oxide (ITO), which has an index of refraction of 2.0 at 550 nm. Other examples include tin antimony oxide and cadmium stannate.

The dielectric materials used in each of the second 220, fourth 240a, sixth 240c, and eighth 240e layers are transparent non-conductive materials having an index of refraction that is lower than that of the substrate 205. Some examples of suitable dielectric materials include magnesium fluoride ($MgF_2$), which has an index of refraction of about 1.38 at 550 nm, and silicon dioxide ($SiO_2$), which has an index of refraction of about 1.46 at 550 nm.

Preferably, the same conductive material is used in each of the first 210, third 230, fifth 240b, seventh 240d and ninth 240f layers and the same dielectric material is used in each of the second 220, fourth 240a, sixth 240c, and eighth 240e layers, however, those skilled in the art will know to use different dielectric materials to tailor the optical properties. Using the same conductive material for each of the first 210, third 230, fifth 240b, seventh 240d, and ninth 240f layers, and the same dielectric material for each of the second 220, fourth 240a, sixth 240c, and eighth 240e layers, advantageously only requires two coating materials to fabricate the entire anti-reflection coating 200.

The physical thickness of each of the nine layers is selected to provide the desired resistance and optical properties of the conductive anti-reflection coating 200. The thickness of each of the first 210 and second 220 layers is selected such that together they form a first simulated quarterwave layer that raises the effective index of refraction of the substrate 205. The thickness of the third layer 230 is selected to provide the desired conductivity and/or an optical thickness of approximately one half of the central wavelength of the spectral region for which the reflectance is to be reduced. For example, the third layer 230 is optionally designed with a thickness that is less than or greater than a halfwave. The thickness of each of the fourth 240a, fifth 240b, sixth 240c, seventh 240d, eighth 240e, and ninth 240f layers is selected such that they collectively form a second simulated quarterwave layer that provides the anti-reflective function and a low surface contact resistance.

Advantageously, the thickness of each dielectric layer in the second simulated quarterwave layer is significantly reduced relative to a quarterwave dielectric layer. Since the resistivity of dielectric layers becomes very low as the thickness of the layers is reduced, the dielectric layers 240a, 240c, and 240e actually support electrical conduction through the stack 240 to the conductive layer 230. This reduces the surface contact resistance.

In the above described embodiments, the conductive anti-reflection coating is modeled after the well-known four layer configuration. More specifically, a first layer formed of a conductive material having an index of refraction that is greater than that of the substrate 110/210 and a second layer formed from a dielectric material having an index of refraction that is less than that of the substrate 120/220, together form a first simulated quarterwave layer. It is also within the scope of the instant invention to design the anti-reflection coating after another configuration, such as a three-layer design, and/or to modify the first simulated quarterwave layer. For example, those skilled in the art will know to modify the number and/or type of layers in the first simulated quarterwave layer to tailor the desired optical properties.

Figure 3:
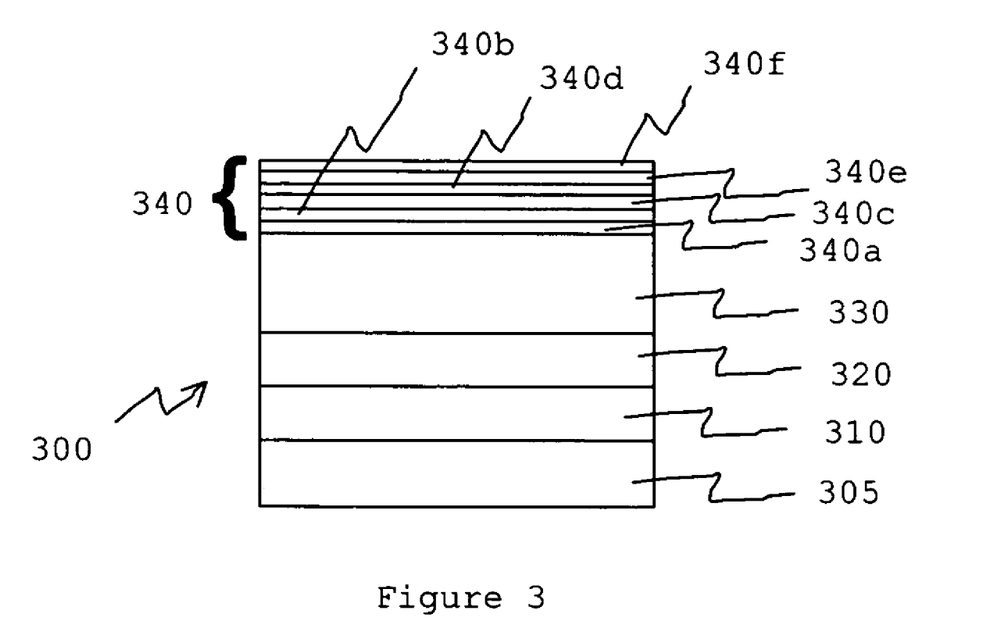
FIG. 3 is a schematic diagram of a conductive anti-reflection coating in accordance with another embodiment of the instant invention.

Referring to FIG. 3, there is shown a conductive anti-reflection coating in accordance with another embodiment of the instant invention. The anti-reflection coating 300, which is disposed on a substrate 305, includes a first layer made of a dielectric material 310, a second layer made of a dielectric material 320, a third layer made of a conductive material 330, a fourth layer made of a dielectric material 340a, a fifth layer made of a conductive material 340b, a sixth layer made of a dielectric material 340c, a seventh layer made of a conductive material 340d, an eighth layer made of a dielectric material 340e, and a ninth layer made of a conductive material 340f. The fourth 340a, fifth 340b, sixth 340c, seventh 340d, eighth 340e, and ninth 340f layers form a stack 340 of six alternating layers of a dielectric material and an electrically conductive material.

The substrate 305 is fabricated from a transparent material such as glass or polymer, which typically has an index of refraction of 1.47 to 1.7 in the visible region (e.g., at 550 nm). Substrate thickness is usually in the range of 0.7 to 4.0 mm. Of course other thicknesses and/or indices of refraction are also possible.

The conductive materials used in each of the third 330, fifth 340b, seventh 340d, and ninth 340f layers are transparent electrically conductive materials having an index of refraction that is greater than that of the substrate. One example of a suitable conductive material is indium tin oxide (ITO), which has an index of refraction of 2.0 at 550 nm. Other examples include tin antimony oxide and cadmium stannate.

The dielectric materials used in each of the second 320, fourth 340a, sixth 340c, and eighth 340e layers are transparent non-conductive materials having an index of refraction that is lower than that of the substrate 305. Some examples of suitable dielectric materials include magnesium fluoride ($MgF_2$), which has an index of refraction of about 1.38 at 550 nm, and silicon dioxide ($SiO_2$), which has an index of refraction of about 1.46 at 550 nm.

The dielectric material used in the first 310 layer is a transparent non-conductive material having an index of refraction that is higher than that of the substrate 305. One example of a suitable dielectric material is indium oxide (InO), which as an index of refraction of about 2.05 at 550 nm.

The physical thickness of each of the nine layers is selected to provide the desired resistance and optical properties of the conductive anti-reflection coating 300. The thickness of each of the first 310 and second 320 layers is selected such that together they form a first simulated quarterwave layer that raises the effective index of refraction of the substrate 305. The thickness of the third layer 330 is selected to provide the desired conductivity and/or an optical thickness of approximately one half of the central wavelength of the spectral region for which the reflectance is to be reduced. For example, the third layer 330 is optionally designed with a thickness that is less than or greater than a halfwave. The thickness of each of the fourth 340a, fifth 340b, sixth 340c, seventh 340d, eighth 340e, and ninth 340f layers is selected such that they collectively form a second simulated quarterwave layer that provides the anti-reflective function and a low surface contact resistance.

Advantageously, the thickness of each dielectric layer in the second simulated quarterwave layer is significantly reduced relative to a quarterwave dielectric layer. Since the resistivity of dielectric layers becomes very low as the thickness of the layers is reduced, the dielectric layers 340a, 340c, and 340e actually support electrical conduction through the stack 340 to the conductive layer 330. This reduces the surface contact resistance.

One method of forming a conductive anti-reflection coating in accordance with the instant invention is by vacuum evaporation. In fact, vacuum evaporation is the preferred method when $MgF_2$ is used as the dielectric material. In vacuum evaporation, a charge of the material to be evaporated is placed in a crucible of a refractory material and the chamber is evacuated to about $10^{-5}$ Torr. An electrical resistance heater heats this charge (either by conduction or by radiation) until its vapor pressure rises and it begins to evaporate. The vapour then condenses on the heated but cooler substrate. Notably, the largest time expenditure includes the time to pump down the chamber and the time to heat and cool the materials. The actual time required for depositing the layers is typically only a small fraction of the total production time.

Advantageously, this method enables the conductive anti-reflection coating in accordance with the instant invention to be deposited in a single vacuum chamber on a large stock-sheet size substrate, without the use of special precision tooling and/or masking fixtures. Furthermore, since the actual time required for depositing the layers is typically only a small fraction of the total production time, the number and thickness of the layers does not have a significant impact on the total production time or cost. Moreover, the additional masking steps of venting and evacuating the chamber and/or heating and cooling the materials are obviated.

Of course, the conductive anti-reflection coating in accordance with the instant invention is optionally formed using other deposition techniques, such as vacuum sputtering.

Advantageously, the very low or negligible contact resistance provided by the instant invention supports the application of anisotropic conductive films (ACFs) and/or conductive epoxies directly on the surface of the anti-reflection coating.

An ACF is an adhesive in which conductive particles are dispersed. When pressure is applied to the film, in a direction perpendicular to the plane of the film, the dispersed particles provide electrical conductivity in the direction perpendicular to the plane of the film.

ACFs are frequently used in thin-film resistive heaters, which for example, are used to maintain LCDs at satisfactory operating temperatures. In these resistive heaters, a pair of bus bars disposed at opposite ends of a conductive anti-reflection coating facilitate the electrical connection to the conductive layer of the coating and ensure that the current is distributed evenly over the area to be heated. Bus bars bonded with an ACF are desirable because they typically have a low-profile, a smooth bus bar surface, and uniform bus bar peel strength.

Until the instant invention, ACF based bus bars have been only applicable on the exposed conductive layer of conductive anti-reflection coatings. As discussed previously, the masking methods used to produce these exposed areas are associated with increased costs and production time. In accordance with the instant invention, the ACF bus bars are attached directly to the surface of the anti-reflection coating. This simplifies production and eliminates process steps.

Figure 4A:
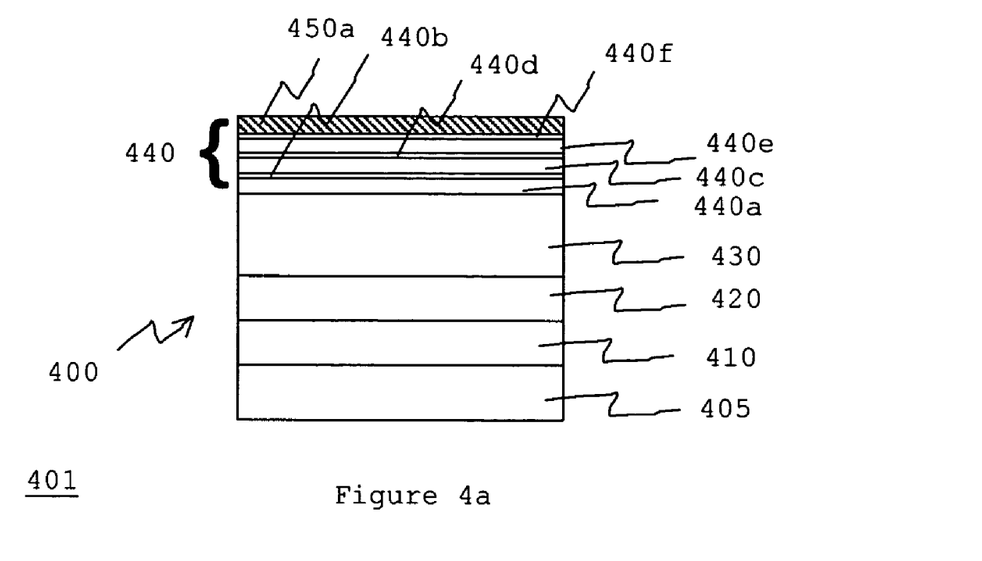

Referring now to FIG. 4a there is shown a thin film resistive heater 401 that uses a conductive anti-reflection coating 400 in accordance with one embodiment of the instant invention. The anti-reflection coating 400, which is deposited on a Borofloat™ substrate 405, includes a first layer 410 formed from ITO, a second layer 420 formed from MgF$_2$, a third layer 430 formed from ITO, a fourth layer 440a formed from MgF$_2$, a fifth layer 440b formed from ITO, a sixth layer 440c formed from MgF$_2$, a seventh layer 440d formed from ITO, an eighth layer 440e formed from MgF$_2$, and a ninth layer 440f formed from ITO.

Figure 4B:
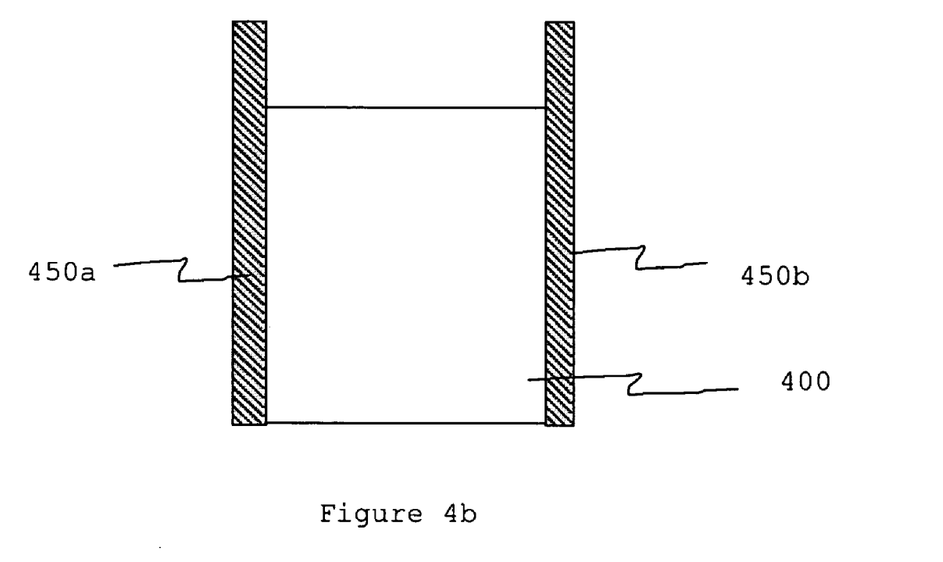

Referring also to FIG. 4b, first 450a and second 450b bus bars are positioned at opposite ends of the anti-reflection coating 400. An electrical power source (not shown) is attached to the bus bars 450a and 450b to provide the current that passes through the conductive layer 430 to produce the resistive heat.

Preferably, the deposition conditions of the layers are optimized to improve the conductance and minimize the surface contact resistance, as discussed above. Advantageously, the thin film resistive heater shown in FIGS. 4a and 4b includes a durable anti-reflection layer 440 and at the same time provides a solid contact to the conductive layer 430.

The instant invention will now be described more specifically with reference to Examples, however, it should be understood that the instant invention is by no means restricted to such specific Examples.

EXAMPLE 1

A 7-layer conductive anti-reflection coating was deposited on a Borofloat™ substrate using vacuum evaporation. More specifically, the layers were deposited according to Table 1, wherein the bottom layer (Layer 1) is in contact with the substrate and the top layer (Layer 7) is in contact with the atmosphere.

TABLE 1

| Layer | Thickness/Material |
|---|---|
| Layer 7 | 6 nm ITO |
| Layer 6 | 28 nm MgF$_2$ |
| Layer 5 | 6 nm ITO |
| Layer 4 | 28 nm MgF$_2$ |
| Layer 3 | 121 nm ITO |
| Layer 2 | 20 nm MgF$_2$ |
| Layer 1 | 21 nm ITO |

Two gold plated thin copper bus bars were bonded to the surface of the anti-reflection coating with an ACF. The measured sheet resistance was 14 ohms/square, while the surface contact resistance was about 0.24 ohms per bus bar. Notably, this surface contact resistance is sufficiently low to support EMI shielding applications.

EXAMPLE 2

A 9-layer conductive anti-reflection coating was deposited on a Borofloat™ substrate using vacuum evaporation. More specifically, the layers were deposited according to Table 2, wherein the bottom layer (Layer 1) is in contact with the substrate and the top layer (Layer 9) is in contact with the atmosphere.

TABLE 2

| Layer | Thickness/Material |
|---|---|
| Layer 9 | 6 nm ITO |
| Layer 8 | 14 nm MgF$_2$ |
| Layer 7 | 6 nm ITO |
| Layer 6 | 14 nm MgF$_2$ |

TABLE 2-continued

| Layer | Thickness/Material |
|---|---|
| Layer 5 | 6 nm ITO |
| Layer 4 | 14 nm MgF$_2$ |
| Layer 3 | 121 nm ITO |
| Layer 2 | 20 nm MgF$_2$ |
| Layer 1 | 21 nm ITO |

Two gold plated thin copper bus bars were bonded to the surface of the anti-reflection coating with an ACF. The measured sheet resistance was 14 ohms/square, while the surface contact resistance was unmeasurable. Notably, this surface contact resistance is low enough to support electrical current flow in thin film resistive heaters.

EXAMPLE 3

A 9-layer conductive anti-reflection coating was deposited on a Borofloat™ substrate using vacuum evaporation. More specifically, the layers were deposited according to Table 3, wherein the bottom layer (Layer 1) is in contact with the substrate and the top layer (Layer 9) is in contact with the atmosphere.

TABLE 3

| Layer | Thickness/Material |
|---|---|
| Layer 9 | 5 nm ITO |
| Layer 8 | 18 nm MgF$_2$ |
| Layer 7 | 5 nm ITO |
| Layer 6 | 18 nm MgF$_2$ |
| Layer 5 | 5 nm ITO |
| Layer 4 | 18 nm MgF$_2$ |
| Layer 3 | 121 nm ITO |
| Layer 2 | 20 nm MgF$_2$ |
| Layer 1 | 21 nm ITO |

Two gold plated thin copper bus bars were bonded to the surface of the anti-reflection coating with an ACF. The measured sheet resistance was 19 ohms/square, while the surface contact resistance was unmeasurable. Notably, this arrangement was designed to minimize reflectance with respect to the anti-reflection coating shown in Example 2. In particular, the ITO layers are thinner and the MgF$_2$ layers are thicker. Although there was an increase in the sheet resistance, due to less conductive material, there was no additional cost in surface contact resistance.

EXAMPLE 4

A 9-layer conductive anti-reflection coating was deposited on a Borofloat™ substrate using vacuum evaporation. More specifically, the layers were deposited according to Table 4, wherein the bottom layer (Layer 1) is in contact with the substrate and the top layer (Layer 9) is in contact with the atmosphere.

TABLE 4

| Layer | Thickness/Material |
|---|---|
| Layer 9 | 5 nm ITO |
| Layer 8 | 18 nm MgF$_2$ |
| Layer 7 | 5 nm ITO |
| Layer 6 | 18 nm MgF$_2$ |
| Layer 5 | 5 nm ITO |
| Layer 4 | 18 nm MgF$_2$ |

TABLE 4-continued

| Layer | Thickness/Material |
| --- | --- |
| Layer 3 | 13 nm ITO |
| Layer 2 | 23 nm MgF$_2$ |
| Layer 1 | 20 nm InO |

Two gold plated thin copper bus bars were bonded to the surface of the anti-reflection coating with an ACF. The measured sheet resistance was 119 ohms/square, while the surface contact resistance was unmeasurable. Notably, this arrangement includes a relatively thin conductive layer (only 13 nm) and a dielectric base layer (20 nm of indium oxide (InO)), which provide the relatively high sheet resistance (119 ohms/square).

In each of the above examples, the conductive anti-reflection coating was found to exhibit a very uniform temperature profile, little heating under the bus bars, and excellent long term resistivity stability. Moreover, the above examples were found to have a reflectance that is similar to, although slightly elevated from, that which would have been obtained with a surface quarterwave dielectric layer.

Notably, these examples indicate that the surface contact resistance becomes a fraction of an ohm when the dielectric layers in the stack approach a physical thickness of about 30 nm, and nonexistent when they approach a physical thickness of about 20 nm.

The embodiments of the invention described above are intended to be exemplary only. For example, while each of the above-described embodiments includes a surface layer formed from a conductive material, other embodiments of the instant invention include a surface layer formed from a dielectric material. The scope of the invention is therefore intended to be limited solely by the scope of the appended claims.

What is claimed is:

1. A conductive anti-reflection coating comprising:
   at least one layer disposed on a surface of a substrate;
   an electrically conductive layer disposed on the at least one layer; and,
   a stack of layers disposed on the electrically conductive layer, the stack of layers including at least four alternating layers of a dielectric material and an electrically conductive material, the stack of layers having a total optical thickness of about one quarter of the central wavelength of a spectral region for which reflectance is to be reduced,
   wherein the electrically conductive material is a transparent material having an index of refraction greater than an index of refraction of the substrate, and wherein the dielectric material is a transparent material having an index of refraction less than the index of refraction of the substrate.

2. A conductive antireflection coating according to claim 1, wherein the at least one layer disposed on the surface of the substrate has a total optical thickness of about one quarter of the central wavelength of the spectral region for which reflectance is to be reduced.

3. A conductive antireflection coating according to claim 1, wherein the stack of layers includes a surface layer formed from the electrically conductive material.

4. A conductive anti-reflection coating according to claim 1, wherein the layers of dielectric material are thicker than the layers of electrically conductive material.

5. A conductive anti-reflection coating according to claim 1, wherein the stack of layers includes at least six alternating layers of the dielectric material and the electrically conductive material.

6. A conductive antireflection coating according to claim 1, wherein the at least one layer comprises a first layer having an index of refraction greater than an index of refraction of the substrate and a second layer having an index of refraction less than the index of refraction of the substrate, the first layer disposed on the surface of the substrate, the second layer disposed on the first layer.

7. A conductive antireflection coating according to claim 1, wherein in the stack of layers, the thickness of each layer of dielectric material is less than about 30 nm.

8. A conductive anti-reflection coating according to claim 7, wherein in the stack of layers, the thickness of each layer of conductive material is less than about 10 nm.

9. A conductive antireflection coating according to claim 1, comprising a bus bar coupled to the stack of layers via a conductive adhesive.

10. A conductive antireflection coating according to claim 9, wherein the conductive adhesive comprises an anisotropic conductive film.

11. A conductive anti-reflection coating comprising:
   at least one layer disposed on a surface of a substrate;
   an electrically conductive layer disposed on the at least one layer; and,
   a stack of layers disposed on the electrically conductive layer, the stack of layers including at least four alternating layers of a dielectric material and an electrically conductive material, the stack of layers having a total optical thickness of about one quarter of the central wavelength of a spectral region for which reflectance is to be reduced,
   wherein the at least one layer comprises a first layer having an index of refraction greater than an index of refraction of the substrate and a second layer having an index of refraction less than the index of refraction of the substrate, the first layer disposed on the surface of the substrate, the second layer disposed on the first layer.

12. A conductive anti-reflection coating according to claim 11, wherein the first layer is formed from the electrically conductive material, the second layer is formed from the dielectric material, and the conductive layer is formed from the electrically conductive material.

13. A conductive antireflection coating according to claim 12, wherein the electrically conductive material comprises ITO and the dielectric material comprises MgF$_2$.

14. A conductive anti-reflection coating comprising:
   a stack of layers for providing low surface contact resistance to a buried conductive layer, the stack of layers including a first layer formed from a first dielectric material, a second layer formed from a first electrically conductive material, a third layer formed from a second dielectric material, and a fourth layer formed from a second electrically conductive material,
   wherein the stack of layers has a total optical thickness substantially equal to one quarter of the central wavelength of a spectral region for which reflectance is to be reduced.

15. A conductive antireflection coating according to claim 14, wherein the stack of layers includes a fifth layer formed from a third dielectric material, and a sixth layer formed from a third electrically conductive material.

16. A conductive antireflection coating according to claim 14, wherein the first and second dielectric materials are a same or different material, and wherein the first and second electrically conductive materials are a same or different material.

17. A conductive anti-reflection coating according to claim 14, wherein each of the first and third layers has a thickness that is less than about 30 nm.

18. A conductive anti-reflection coating according to claim 17, wherein each of the second and fourth layers has a thickness that is less than about 10 nm.

19. A conductive anti-reflection coating according to claim 14, wherein the low surface contact resistance is sufficiently low for thin film resister heater applications.

20. A conductive anti-reflection coating comprising:
a first layer deposited on one side of a substrate, the first layer formed from a material having an index of refraction that is greater than an index of refraction of the substrate;
a second layer deposited on the first layer, the second layer formed from a dielectric material having an index of refraction that is less than the index of refraction of the substrate;
a third layer deposited on the second layer, the third layer formed from an electrically conductive material having an index of refraction that is greater than the index of refraction of the substrate;
a fourth layer deposited on the third layer, the fourth layer formed from the dielectric material and being less than about 30 nm thick;
a fifth layer deposited on the fourth layer, the fifth layer formed from the electrically conductive material and being less than about 10 nm thick;
a sixth layer deposited on the fifth layer, the sixth layer formed from the dielectric material and being less than about 30 nm thick; and
a seventh layer deposited on the sixth layer, the seventh layer formed from the electrically conductive material and being less than about 10 nm thick,
wherein the fourth, fifth, sixth, and seventh layers collectively form at least part of a simulated quarterwave layer.

21. A conductive anti-reflection coating according to claim 20, comprising an eighth layer deposited on the seventh layer and a ninth layer deposited on the eighth layer, the eighth layer formed from the dielectric material and being less than about 30 nm thick and the ninth layer formed from the electrically conductive material and being less than about 10 nm thick.

22. A conductive anti-reflection coating according to claim 21, wherein the electrically conductive material comprises ITO.

23. A conductive anti-reflection coating according to claim 22, wherein the dielectric material comprises one of $SiO_2$ and $MgF_2$.

24. A conductive anti-reflection coating according to claim 21, wherein the fourth, sixth, and eighth layers are each less than about 20 nm thick, and wherein the fifth, seventh, and ninth layers are each less than about 8 nm thick.

25. A conductive anti-reflection coating according to claim 21, wherein the fourth, fifth, sixth, seventh, eighth and ninth layers have a combined optical thickness of about one quarter wavelength of visible light.

26. A conductive anti-reflection coating according to claim 20, wherein the fourth, fifth, sixth, and seventh layers have a combined optical thickness substantially equal to one quarter wavelength of visible light.

27. A conductive anti-reflection coating comprising:
a stack of layers for providing low surface contact resistance to a buried conductive layer, the stack of layers including a first dielectric layer disposed on the buried conductive layer, a second conductive layer disposed on the first dielectric layer, and a third dielectric layer disposed on the second conductive layer, wherein the stack of layers forms a simulated quarterwave layer.

28. A method of forming a conductive anti-reflection coating comprising:
depositing at least one layer on a surface of a substrate;
depositing an electrically conductive layer on the at least one layer; and,
depositing a stack of layers on the electrically conductive layer, the stack of layers including at least four alternating layers of a dielectric material and an electrically conductive material, the stack of layers having a total optical thickness of about one quarter of the central wavelength of a spectral region for which reflectance is to be reduced, wherein the electrically conductive material is a transparent material having an index of refraction greater than an index of refraction of the substrate, and wherein the dielectric material is a transparent material having an index of refraction less than the index of refraction of the substrate.

29. A method of forming a conductive anti-reflection coating according to claim 28, wherein depositing the least one layer, depositing the electrically conductive layer, and depositing the stack of layers each comprises a vacuum evaporation technique.

30. A method of forming a conductive anti-reflection coating according to claim 28, comprising providing a bus bar on a surface layer of the stack of layers via a conductive adhesive.

* * * * *